L. G. CARILLON.
TIRE CONSTRUCTION.
APPLICATION FILED JULY 10, 1919.
1,374,904.
Patented Apr. 19, 1921.
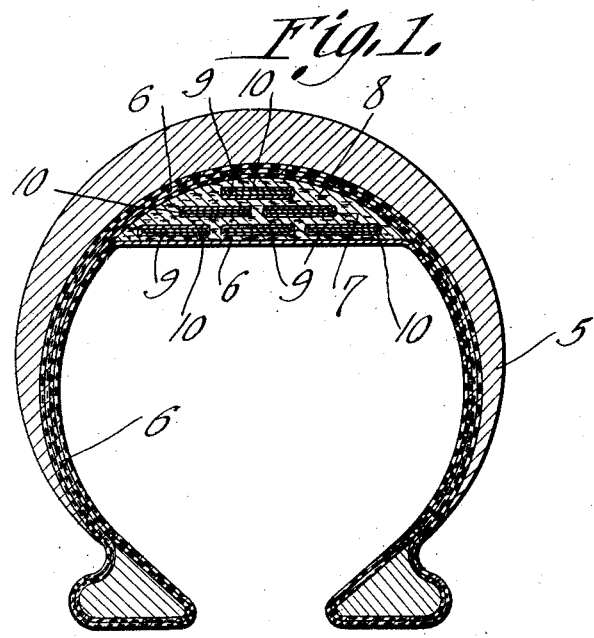
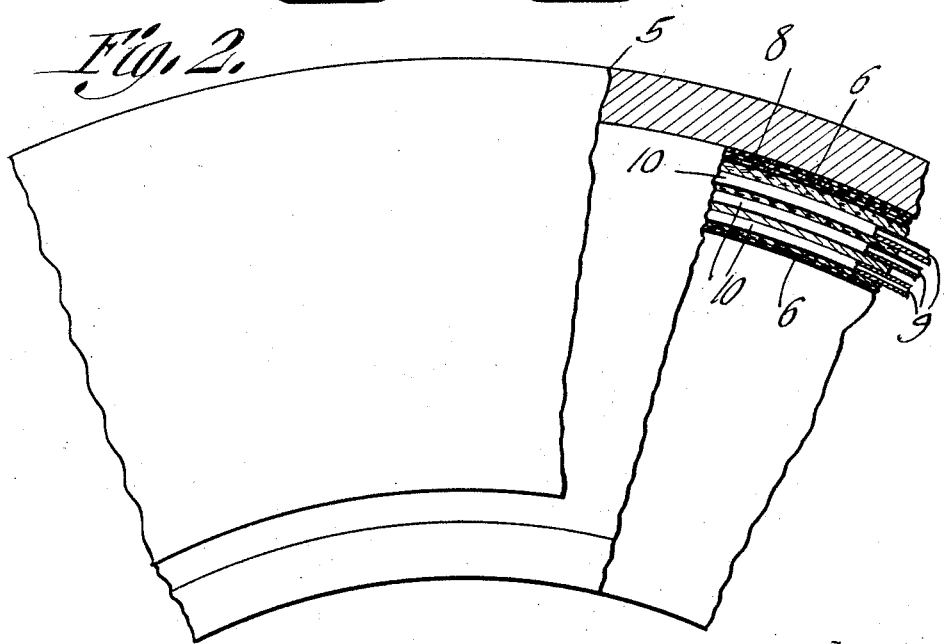
L. G. Carillon, Inventor

UNITED STATES PATENT OFFICE.

LEWIS GUST CARILLON, OF BARBERTON, OHIO.

TIRE CONSTRUCTION.

1,374,904. Specification of Letters Patent. Patented Apr. 19, 1921.

Application filed July 10, 1919. Serial No. 309,811.

*To all whom it may concern:*

Be it known that I, LEWIS GUST CARILLON, a citizen of the United States, residing at Barberton, in the county of Summit and State of Ohio, have invented a new and useful Tire Construction, of which the following is a specification.

The present invention relates to tire shoes for pneumatic tires, the principal object being to provide a protective casing or shoe having armor plates incorporated therein in such a manner as to prevent nails and other sharp members piercing the inner tube to puncture the same.

A further object of the invention is to provide a pneumatic tire shoe wherein the protective plates or elements are arranged in a novel and efficient manner.

Still another object of the invention is to provide a tire shoe or casing having puncture proof elements therein which will insure the pneumatic tire against punctures, blowouts and the like, and which does not possess cumbersome features.

Another general object of the invention is to provide a tire shoe having the above characteristics which is simple in construction, which consists of few parts, and which may be manufactured and sold at a minimum cost.

With the above and other objects and advantages in mind, the invention consists of combinations of elements, constructions and arrangements of parts, all of which will be hereinafter enlarged upon and set forth in the appended claim, the invention being illustrated in the attached drawings, wherein:—

Figure 1 is a transverse sectional view of a tire shoe constructed in accordance with the invention;

Fig. 2 is a fragmentary side view of the tire shoe, parts being broken away to illustrate the interior of the shoe.

The tire shoe is designated at 5 and consists of a number of layers of fabric 6, the innermost layer being spaced from the remaining layers at the crest of the tire to afford a pocket 7 which is of semi-circular configuration.

A filler 8 of cork or other suitable material is disposed in the pocket 7.

Extending longitudinally through the filler 8 at the top face thereof is a plurality of circumferential plates or bands 9, the innermost plates being arranged in spaced relation to the outermost plates and extend parallel to the innermost plates and overlie the spaces between the longitudinal edges of the same. In order to firmly retain the plate in the cork or filler the plates are placed in canvas covers or sheaths 10. Preferably the plates 8 are formed of metal but they may be made of any material which cannot be pierced by sharp obstacles.

In assembling the shoe or tire, the filler is secured in position and the inner tube is placed in the shoe in the usual manner and against the innermost layer of fabric and in position to be protected by the circumferential plates or bands.

The embodiment of the invention herein shown and described is considered the preferred construction, but it is to be understood that the same may be modified and altered in many respects, and that my limits of such modification are governed only by what is claimed.

What is claimed is:

A tire shoe comprising textile layers, one of which is spaced from the other to form, at the tread of the shoe, a pocket the inner wall of which extends from one side of the shoe to the other and is disposed throughout its entire width at right angles to the median plane of the shoe; a circumferential filler in the pocket and conforming closely to the cross sectional contour of the pocket; circumferential metal bands embedded in the filler and inclosed in sheaths, all of the bands being disposed at right angles to the median plane of the shoe, the bands being placed edge to edge in rows, the bands of one row being located in break-joint order with respect to the bands of an adjoining row, the side edges of the bands of the inner row being located close to said other layer, the number of bands in the rows decreasing to a single outer band disposed in the median plane of the shoe.

In testimony that I claim the foregoing as my own, I have hereto affixed my signature in the presence of two witnesses.

LEWIS GUST CARILLON.

Witnesses:
W. A. MORTON,
RAY E. MORTON.